United States Patent [19]

Stecker et al.

[11] Patent Number: 5,701,953
[45] Date of Patent: Dec. 30, 1997

[54] WELL HEAD FOR ENVIRONMENTAL EXTRACTION WELLS

[75] Inventors: Philip P. Stecker, Milwaukee; Christine M. Liethen, Sheboygan, both of Wis.

[73] Assignee: CH2M Hill, Inc., Milwaukee, Wis.

[21] Appl. No.: 724,750

[22] Filed: Oct. 2, 1996

Related U.S. Application Data

[60] Provisional application No. 60/018,553 May 29, 1996.
[51] Int. Cl.$^6$ ............................ B09B 3/00; E21B 33/04; E21B 33/068
[52] U.S. Cl. .......................... 166/75.13; 166/75.14; 166/379; 405/129
[58] Field of Search ..................... 166/75.13, 75.14, 166/85.1, 369, 370, 379; 210/901; 405/129

[56] References Cited

U.S. PATENT DOCUMENTS

| | | | |
|---|---|---|---|
| 2,482,616 | 9/1949 | Gregory et al. | 166/85.1 |
| 3,504,742 | 4/1970 | Crawford | 166/75.13 |
| 4,026,355 | 5/1977 | Johnson et al. | 405/129 X |
| 4,457,448 | 7/1984 | Beagell | 166/75.13 X |
| 4,844,156 | 7/1989 | Hesh | 166/370 X |
| 5,143,606 | 9/1992 | Bernhardt | 210/901 X |
| 5,195,590 | 3/1993 | Kenner | 166/379 |

OTHER PUBLICATIONS

Commercial drawing from LPG&E, copyrighted 1995.

Primary Examiner—George A. Suchfield
Attorney, Agent, or Firm—Quarles & Brady

[57] ABSTRACT

A well head for landfills or other sites at which waste has been disposed provides an enlarged chamber at the top of a well pipe holding hose and cable terminations on the walls of the chamber positioned out of the access path of the well pipe. A cover unattached to the hoses and cables can be removed for access without interference from the terminations. An extraction port in the cover defines a clear channel into the well pipe for sampling and monitoring equipment.

8 Claims, 2 Drawing Sheets

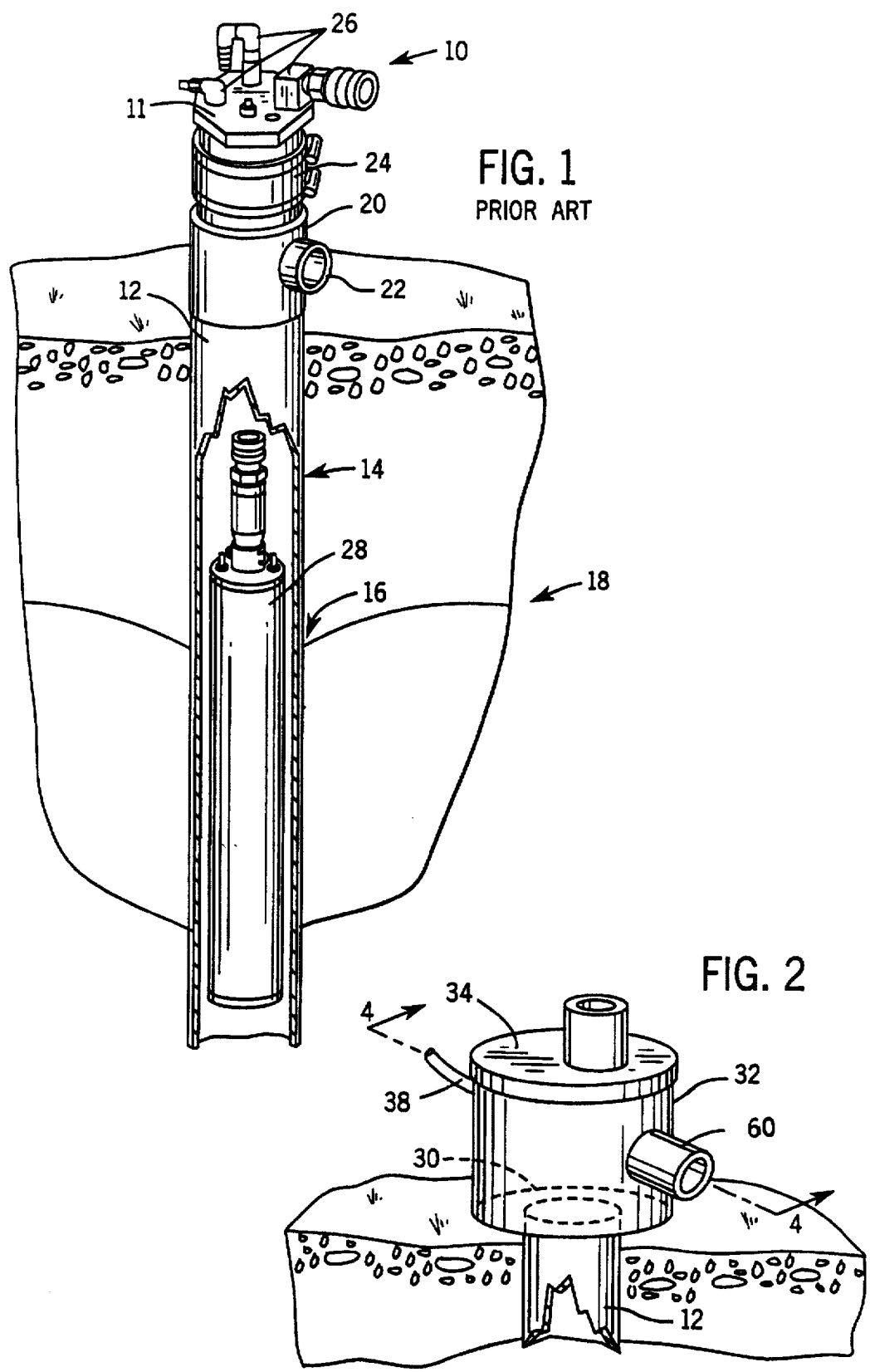

WELL HEAD FOR ENVIRONMENTAL EXTRACTION WELLS

The benefit of provisional application Ser. No. 60/018,553 filed May 29, 1996 is claimed.

FIELD OF THE INVENTION

The invention relates generally to well head assemblies for the top of environmental extraction wells and more particularly to a well head assembly better adapted to operating, maintaining, monitoring, and measuring tasks associated with environmental extraction wells.

BACKGROUND OF THE INVENTION

Landfills or sites at which waste has been disposed, may over time generate toxic and combustible (notably methane) gases and polluting liquids. To prevent the escape of such gases, wells may be sunk in the landfill to draw off and collect the gases to prevent them from escaping into the atmosphere. The same wells may be used to extract groundwater and leachate to prevent them from migrating to the water table. As is standard practice after the wells are drilled, they are lined with a well pipe through which gases and liquids may be conducted.

The tops of the well pipes protrude from the surface of the landfill. A gas port may extend out the side of the pipe above the ground through a "T"-type fitting attached to a collection manifold communicating with a number of wells. The upper opening of the pipe or T-fitting is then capped to seal the pipe from the atmosphere.

The cap may be perforated by one or more couplings that communicate with hoses descending into the well pipe and through which liquid may be drawn or pressurized air or electricity introduced. The liquid recovered from the well is usually pumped by a submersible pump suspended at a depth within the well and communicating with one or more of these hoses. In order to prevent these hoses from the submersible pump from being placed under excessive tension, a separate support cable is usually tied to the pump. The other end of this cable may be anchored to the inside of the cap for ready access.

Periodically it becomes necessary to open the wells for the purpose of introducing test equipment or for replacing the pump or inspecting other components within the well. Opening the wells can expose personnel to toxic gases and liquids. It is therefore desirable to limit the number of personnel and time required for such procedures.

This is not always possible. The difficulty of unfastening and removing the cap and the weight of the hoses, pump, and anchor cable may require two or more people to remove the cap. Once the cap is raised, care must be taken not to damage the hoses, for example, as might occur if the cap were placed on the ground with the hoses catching against the edges of the well pipe. Finally, once the cap is removed, various hoses and cables typically interfere with the insertion of the measuring instruments.

SUMMARY OF THE INVENTION

The present invention eliminates many of the problems associated with well servicing by an improved well head design. The present invention recognizes that the well head need not be limited to the diameter of the well pipe but may be expanded to provide an access chamber. Once so expanded, hose couplings and cable anchor points may be attached to the walls of the chamber rather than the cap, allowing the cap to be unencumbered by such hoses and cables. The larger chamber area also permits hose couplings to be moved out of a clear access channel so as to provide for unencumbered pump removal and insertion of measurement equipment into the well pipe.

Specifically, the invention includes a chamber having a lower base surrounded by upstanding walls. The base includes an aperture hermetically connected to an upper lip of the well pipe, the base defining a chamber volume having an area measured across the bore axis substantially greater than an area of opening of the well pipe. An upper cover receivable by the upstanding walls hermetically seals the chamber volume when so received. A hose coupling has one half attached to a wall of the chamber and is positioned outside an imaginary access cylinder passing along the bore axis into the well pipe.

Thus, it is one object of the invention to simplify the servicing of environmental extraction wells by removing connection points from the well cap itself.

It is another object of the invention to permit equipment such as pumps to be drawn up out of the well pipe without interference from the connection points.

The upper cover may include a vertically extending access tube wherein the imaginary access cylinder corresponds in diameter with an inside bore of the access tube.

It is another object of the invention to provide a predefined clear access channel into the well, free of cables and hoses, for the rapid insertion of a pump and measurement equipment without the need to completely remove a lid to which cables and hoses are attached.

The foregoing and other objects and advantages of the invention will appear from the following description. In this description, reference is made to the accompanying drawings which form a part hereof and in which there is shown by way of illustration a preferred embodiment of the invention. Such embodiment does not necessarily represent the full scope of the invention, however, and reference must be made therefore to the later filed claims for interpreting the scope of the invention.

BRIEF DESCRIPTION OF THE DRAWINGS

FIG. 1 is a partial cutaway perspective view of a prior art environmental extraction well and well cap;

FIG. 2 is a figure similar to that of FIG. 1 but showing the well head of the present invention;

DETAILED DESCRIPTION OF THE PREFERRED EMBODIMENT

Figure 3:
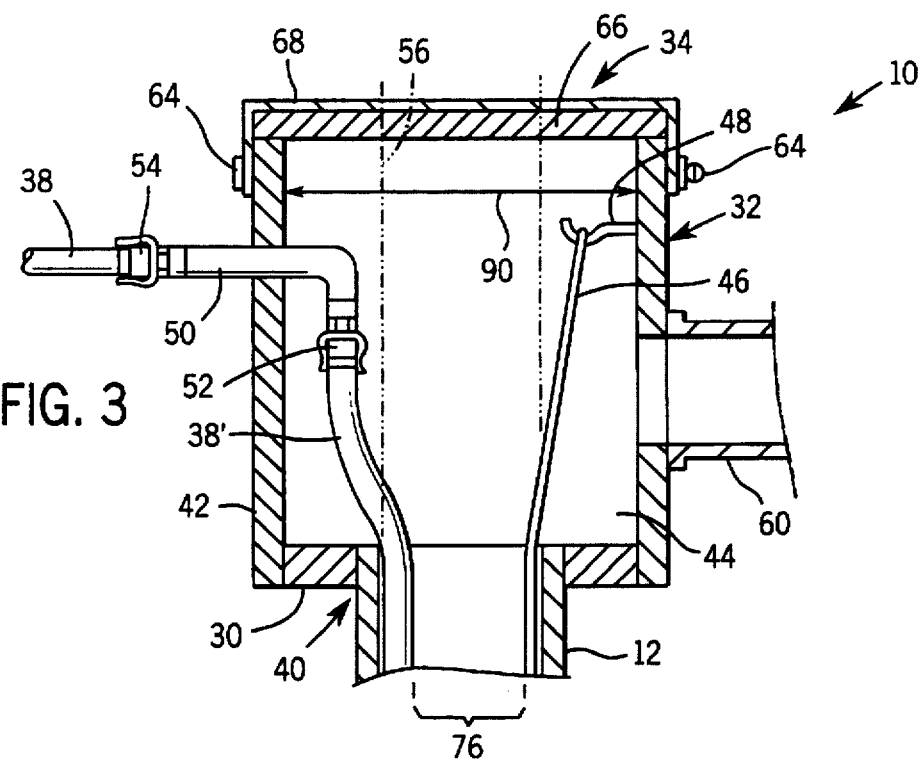
FIG. 3 is a cross section of the well head of FIG. 2 but having an alternative embodiment of the top than that shown in FIG. 2 and taken along line 4—4 of FIG. 2.

Referring to FIG. 1, a prior art well head 10 caps a well pipe 12 passing through a bore 14 to a water table 16 in a landfill 18. The cap 11 is placed on top of T-fitting 20 which provides a port 22 for the collection of gases. A collar 24 holds a cap 11 to the top of the T-fitting 20. The cap 11 supports a number of couplings 26 which connect to hoses (not shown) inside the pipe 12 and outside the pipe 12, at least one of which connects to a submersible pump 28. Access to the well pipe 12 requires removal of the cap 11 and the raising of all the hoses and cables attached thereto.

Figure 4:
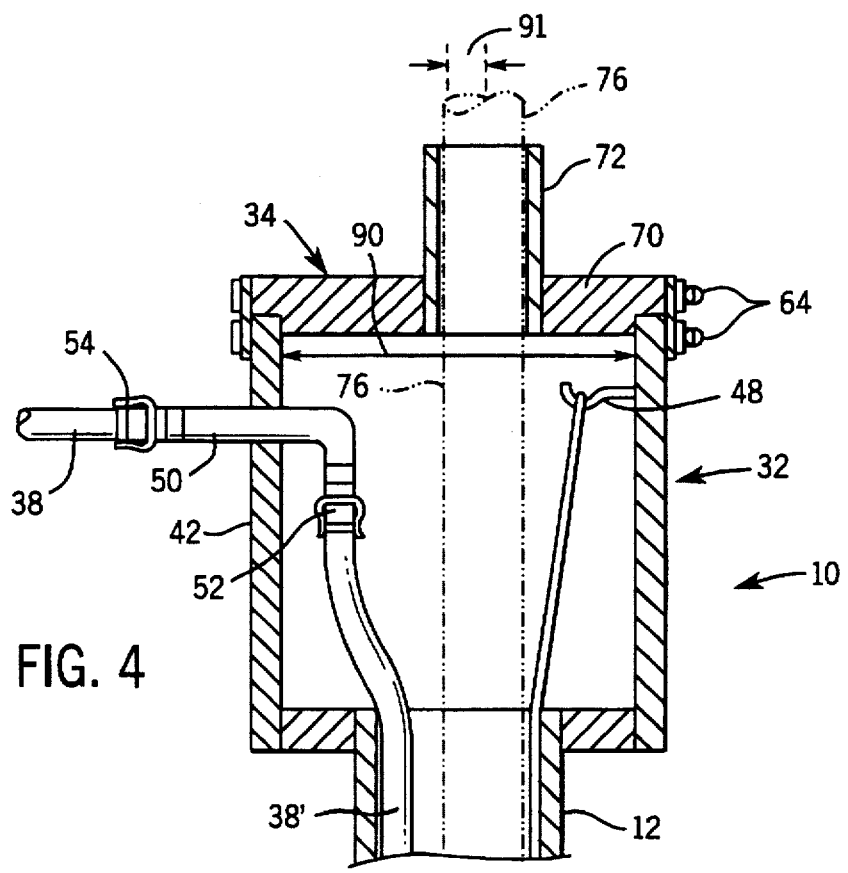
FIG. 4 is a cross-sectional view of the well head of FIG. 2 taken along line 4—4 in an embodiment without a gas port.

Referring now to FIGS. 2, 3 and 4 in the present invention, the well pipe 12 is attached at its upper edge to a large diameter circular base 30 which provides a transition from the well pipe 12 to an expanded cylindrical chamber 32 of greater diameter 90 than the well pipe 12 and having a cap 34 of equal area to the base 30. A gas port 60 and leachate hose 38 exit from the sidewalls of the chamber 32 leaving the cap 34 unencumbered.

Referring now to FIG. 3, the well pipe 12 passes through a circular orifice 40 in base 30, the orifice 40 having a diameter matching the outer diameter of the well pipe 12. The base 30 attaches at its outer periphery to upstanding chamber walls 42 forming a cylindrical tube having a diameter 90 substantially greater than the inside diameter of the well pipe 12. The base 30 and walls 42 define a chamber volume 44 into which a continuation of leachate hose 38' and support cable 46 may be held. The support cable 46 may be tied to a hook 48 attached to the inner surface of the sidewalls 42 and extending inward therefrom. The continuation of the leachate hose 38' may be attached to an L-shaped hanger tube 50 extending radially through the sidewalls 42 and angling vertically downward to have, at its lowermost extension, a connector 52 attached to a corresponding connector on the end of the hose 38' within the chamber volume 44. Because hook 48 and connector 52 are close to the cap 34, they are easily accessible and can be recovered if the leachate pump must be removed.

A second connector 54 on the other end of the hanger tube 50 connects to a corresponding connector on the continuation of the hose 38.

In the preferred embodiment, the connector 52 as well as the hanger tube 50 and the hook 48 are placed outside a cylindrical volume 56 being, in this case, the continuation of the inner diameter of the well pipe 12. Thus, free access to the well pipe 12 via this volume 56 is assured.

A gas port 60 passes radially through sidewall 42 opposite the hanger tube 50 and provides a passageway from the chamber volume 44 outside the chamber 32 for connection to a gas collection manifold such as is well known in the art.

It will be appreciated from the above description that the cap 34 is free from all encumbrances from the hose 38 or cable 46 and thus may be raised once fasteners 64 are disconnected. The cap 34 is a cylindrical disk 66 fitting snugly against the upper edge of the walls 42 held in place by a wrapper 68 fitting over the disk 66 and extending a brief distance down the sidewalls 42 to be engaged by the fastener 64 which may be a stainless steel hose clamp or the like.

In the event that a pump must be removed or a measurement or inspection of the well is required, the cap 34 may be easily removed and replaced and once removed, access to the well pipe 12 is readily had.

Referring now to FIG. 4 in a second embodiment, the cap 34 is a single disk 70 having a notch removed around its circumference so as to fit a short distance inside the walls 42 and then to rest on top of those walls 42 providing a hermetic plug when held by fasteners 64. A cylindrical port 72 may be cut in cap 34 along an axis generally parallel to the axis of the well pipe 12 but offset therefrom by offset 91. The inner diameter of this port 72 allows a second cylindrical volume 76 that, as a result of the location of hook 48 and hanger tube 50 described above with respect to FIG. 3, is unobstructed as it extends into the well pipe 12. This cylindrical volume 76 has a lesser diameter than the inner diameter of well pipe 12 but is of sufficient diameter to accept a flow measuring tube such as that manufactured by several different companies. As a result of the design of the well head 10, equipment inserted through port 72 will be assured of clear passage into the well pipe 12 without the need to remove the cap 34 and even if a pump is needed in the well to extract leachate or other liquids.

The well head 10 herein described may be constructed of plastic or metal material and the ports 72 and 60 welded to this material by well known techniques. The well head may be attached to the well pipe 12 either directly or by means of an intermediary flange.

The above description has been that of a preferred embodiment of the present invention. It will occur to those that practice the art that many modifications may be made without departing from the spirit and scope of the invention.

We claim:

1. A well head for the top of well pipes extending downward along a bore axis into landfills, the well pipes conducting toxic liquids and gases out of the well, the well head comprising:

a chamber having a lower base surrounded by upstanding walls, the base including an aperture hermetically connected to an upper lip of the well pipe, the base defining a chamber volume having an area measured across the bore axis substantially greater than an area of opening of the well pipe;

an upper cover receivable by the upstanding walls to hermetically seal the chamber volume when so received; and a hose coupling having one half attached to a wall of the chamber to transfer weight of an attached hose to the wall, the hose coupling further positioned outside an imaginary access cylinder passing along the bore axis into the well pipe whereby the base aperture may remain unobstructed by supporting structure.

2. The well head of claim 1 wherein the imaginary access cylinder corresponds in diameter to the area of opening of the well pipe.

3. The well head of claim 1 wherein the upper cover when removed provides an opening into the chamber having an area measured across the bore axis substantially equal to that of the chamber.

4. The well head of claim 1 wherein the upper cover has a vertically extending access tube and wherein the imaginary access cylinder corresponds in diameter with an inside bore of the access tube.

5. The well head of claim 4 wherein the imaginary access cylinder is offset from an axis of the well pipe.

6. The well head of claim 1 including in addition a gas extraction port attached to a chamber wall and extending outward therefrom to provide a passageway through the chamber wall.

7. The well head of claim 1 including in addition an anchor attached to an inner surface of the chamber walls providing a tie point for a cable.

8. The well head of claim 7 wherein the anchor is positioned outside of an imaginary access cylinder passing along the bore axis into the well pipe.

* * * * *